No. 862,942. PATENTED AUG. 13, 1907.
F. D. SHANK.
HAY STACKING MACHINE.
APPLICATION FILED OCT. 18, 1905.

Witnesses:
F. S. Slater
R. R. McHaley

Inventor:
Fred D. Shank

UNITED STATES PATENT OFFICE.

FREDERICK D. SHANK, OF MOUNT VERNON, OREGON, ASSIGNOR OF ONE-HALF TO WELLS W. WOOD, OF CANYON CITY, OREGON.

HAY-STACKING MACHINE.

No. 862,942.　　　　Specification of Letters Patent.　　　　Patented Aug. 13, 1907.

Application filed October 18, 1905. Serial No. 283,359.

*To all whom it may concern:*

Be it known that I, FREDERICK D. SHANK, a citizen of the United States, residing at Mount Vernon, in the county of Grant and State of Oregon, have invented a new and useful Hay-Stacking Machine, of which the following is a specification.

My invention relates to hay stacking machines, and has particular reference to large machines which require the application of horses or other animals for their operation. In such machines, much greater power is required to start the load receptacle upward on account of inertia and insufficient counterbalancing. Furthermore, in returning the empty load receptacle to its position to receive another load, it is customary to back the horses to lower the load receptacle gradually and prevent its falling.

The principal objects of my invention are to so counterbalance the moving part that the effective weight of the load and receptacle at different points of travel shall be opposed by different counterweights, whereby a minimum hoisting power may be employed; and to provide a machine in which the load receptacle will return to its lower position without jar or shock when allowed to descend by its own weight. I attain these and other objects by, and the invention consists in, the combination of parts of a hay stacking machine hereinafter described, and shown in the accompanying drawings in which—

Figure 1:
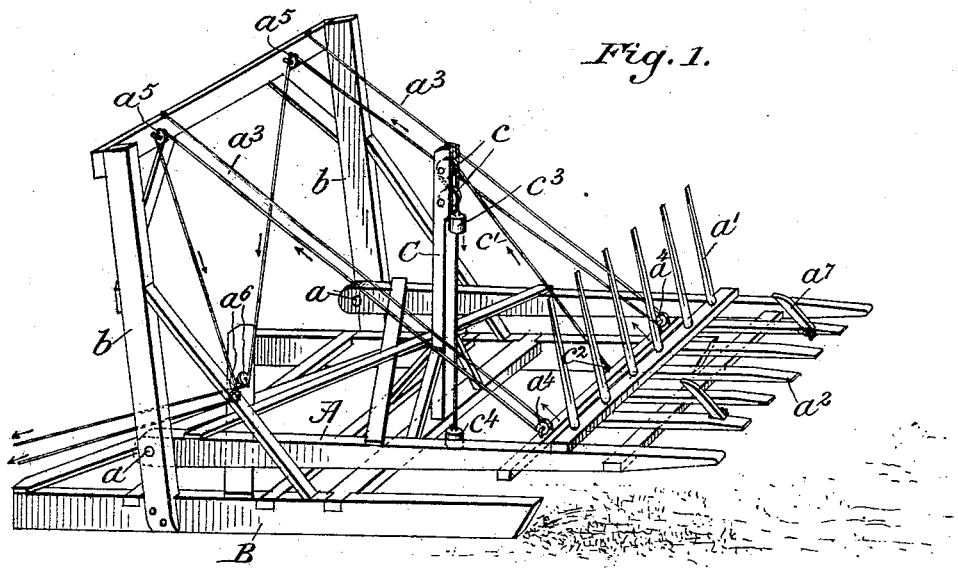
Figure 2:
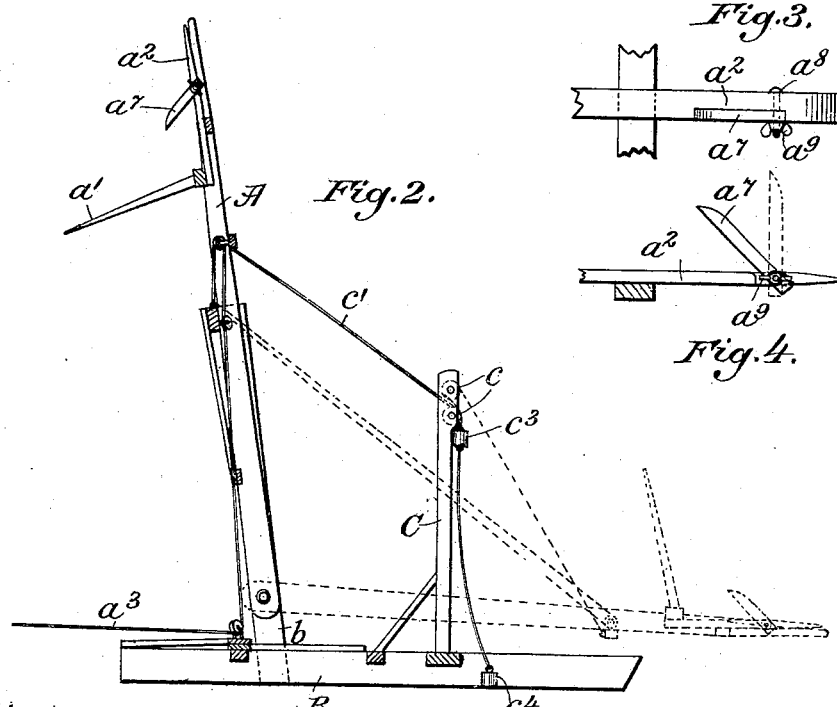
Figure 3:
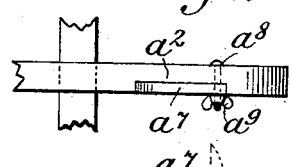
Figure 4:
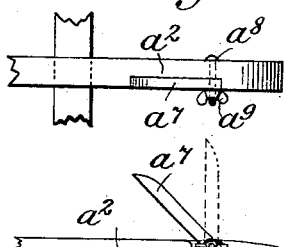

Figure 1 is a view in perspective of a machine embodying my improvements; Fig. 2 is a side view in vertical section of the same, showing in full lines the load receptacle in its raised position, and by dotted lines in its lowered position; and Figs. 3 and 4 are details, showing the load-retaining dogs or catches.

Referring to the drawings, it will be seen that my machine consists of the usual fork A and base frame B. An upright frame $b$. is attached to the base frame near one end thereof, and to this the fork A is pivoted at $a$. At the other end of the fork is the load receptacle comprising two sets of fingers $a'$ $a^2$. The fork is raised from its lowered position in any suitable manner such as by ropes connected to the parts in any suitable way. As shown in the drawings, the two ropes $a^3$ are attached to a crosspiece of the upright frame $b$ and pass around pulley $a^4$ upon the fork, then around fixed pulleys $a^5$ upon said upright frame, then around fixed pulleys $a^6$ upon the base frame, and then to the horses employed as power.

Upon some of the fingers $a^2$ I preferably arrange pivoted dogs or catches $a^7$ which constitute retaining means for the load after it is deposited upon the load receptacle and prevent its being dragged therefrom by the rake, or thrown too far when the rake is raised forcibly to its upper position. The method of attaching these dogs is clearly shown in Figs. 3 and 4 and comprises a bolt $a^8$ passing through the finger $a^2$, and a thumb nut $a^9$.

In order to properly counterbalance the fork and the load which it is designed to elevate, I provide a standard C mounted in any suitable way upon the base frame B between the upright frame $b$ and the load receptacle end of the fork. At its upper end this standard C is provided with two pulleys $c$ one above the other, over which the counterbalance rope $c'$, which is attached to the fork at $c^2$, is designed to pass. This rope $c'$ is provided with two counterweights $c^3c^4$ arranged in series thereon in such a manner that they exert their influence upon the fork at different stages of the latter's travel.

The operation of the machine is as follows: In its initial position the fork occupies the position shown in Fig. 1, and indicated in dotted lines in Fig 2, in which position both of the weights $c^3c^4$ are off the ground and exert their influence upon the fork. When the fork starts up, therefore it is counterbalanced by the maximum weight to assist in raising it, and when it reaches a position approximately midway between its initial and final elevated position the weight $c^4$ rests upon the ground. This leaves the fork and load counterbalanced by the weight $c^3$ only, which is all that is necessary because the fork in this position requires less power to move it. When the fork reaches a position approximately two-thirds towards its final position the second weight $c^3$ rests upon the ground and the fork is raised then only by the pull of the horse power, being nearly in a vertical position. As it continues its motion, the fork then lifts the weight $c^3$ again from the ground to check its momentum after passing over center and when about to discharge the load. After the load has been discharged the weight $c^3$ will then start the fork on its downward travel, the horse-power having been detached, and the fork will then return of its own weight to its initial lowered position being first checked when about one-third lowered by picking up weight $c^3$, and again being further checked toward the end of its travel by the picking up of the second weight $c^4$ and assuming its lowered position gently and without shock or jar.

It will of course be understood that the drawing is only illustrative and that the parts are suitably proportioned as to size and weight, the weights being sufficiently heavy to nearly balance the carriage when in operation.

Many changes may of course be made in the details of construction and arrangement of parts without departing from the spirit of my invention.

Having described my invention, what I claim as new and desire to secure by Letters Patent of the United States, is—

1. In a haystacking machine, the combination with a frame and a load receptacle, of a flexible counterweight connection for said receptacle having weights attached thereto in series and arranged to become effective at different points of travel of said receptacle, substantially as described.

2. In a hay stacking machine, the combination with a frame and a load receptacle, of a flexible counterweight connection for said receptacle having weights thereto in series, both of said weights being effective when the receptacle is in its lowered position and one of said weights becoming ineffective after the load has been raised a predetermined distance, substantially as described.

3. In a hay stacking machine, the combination with a frame and a fork member pivoted thereto, of a flexible counterweight connection attached to said fork member, fixed pulleys over which said flexible connection passes, and weights attached to said flexible connection in series one below the other at such points that both weights are effective when the fork is in its initial position, the lower weight becoming ineffective after the fork has been raised a pre-determined distance, substantially as described.

4. In a hay stacking machine, the combination with a frame and a fork member pivoted thereto, of a flexible counterweight connection attached to said fork member, fixed pulleys over which said flexible connection passes, and weights attached to said flexible connection in series one below the other at such points that both weights are effective when the fork is in its initial position, the lower weight becoming ineffective first when the fork has traveled a pre-determined distance, the upper weight then becoming ineffective and afterwards again effective as the fork pases over center, substantially as described.

5. In a haystacking machine, the combination with a frame and a fork member pivoted thereto, of a flexible counter-weight connection for said fork member having weights attached thereto in series, one only of said weights becoming effective initially to check the downward movement of said fork member, and the other weight becoming thereafter effective as the fork member nears the end of its downward travel, substantially as described.

6. In a hay stacking machine, the combination with a frame and a fork provided with a load receptacle comprising two sets of fingers, retaining dogs or catches inset upon fingers of the set designed to receive the load and pivotally secured thereto by means of thumb screws, substantially as described.

FRED. D. SHANK.

Witnesses:
ORIN L. PATTERSON,
GEO. F. WARD.